June 16, 1953

D. W. EPSTEIN 2,642,488

SCHMIDT TELEVISION PROJECTOR HAVING MENISCUS
TO CORRECT FOR ANTIHALATION LENS

Filed Jan. 3, 1949

INVENTOR
David W. Epstein
BY
ATTORNEY

Patented June 16, 1953

2,642,488

UNITED STATES PATENT OFFICE 2,642,488

SCHMIDT TELEVISION PROJECTOR HAVING MENISCUS TO CORRECT FOR ANTIHALATION LENS

David W. Epstein, Princeton, N. J., assignor to Radio Corporation of America, a corporation of Delaware Application January 3, 1949, Serial No. 68,878

4 Claims. (Cl. 340—370)

The present invention relates to image projection systems employing reflective optics, and more particularly, but not necessarily exclusively to an improved projection system of the type comprising a spherical mirror and a spherical aberration correcting means or correcting plate.

The present invention has for its principal aim to improve projection systems employing reflective optics by the addition of optical elements in a novel manner thereby to make possible the use of a weaker correcting plate. The weaker correcting plate plus the added elements permits higher resolution for off-axis points.

Another and more specific aim or object of the invention is to provide an image projection system of the type employing a spherical mirror and correcting lens with a meniscus which is concentric with the spherical mirror thereby to permit use of a weaker correcting plate.

A further object of the invention is to provide an image projection system of the type employing a spherical mirror and correcting lens with a meniscus and an antihalation lens which are arranged in a novel manner.

Other objects and advantages of the present invention will, of course, become apparent and immediately suggest themselves to those skilled in the art to which the invention is directed from a reading of the following specification in connection with the accompanying drawing in which.

Figure 1:
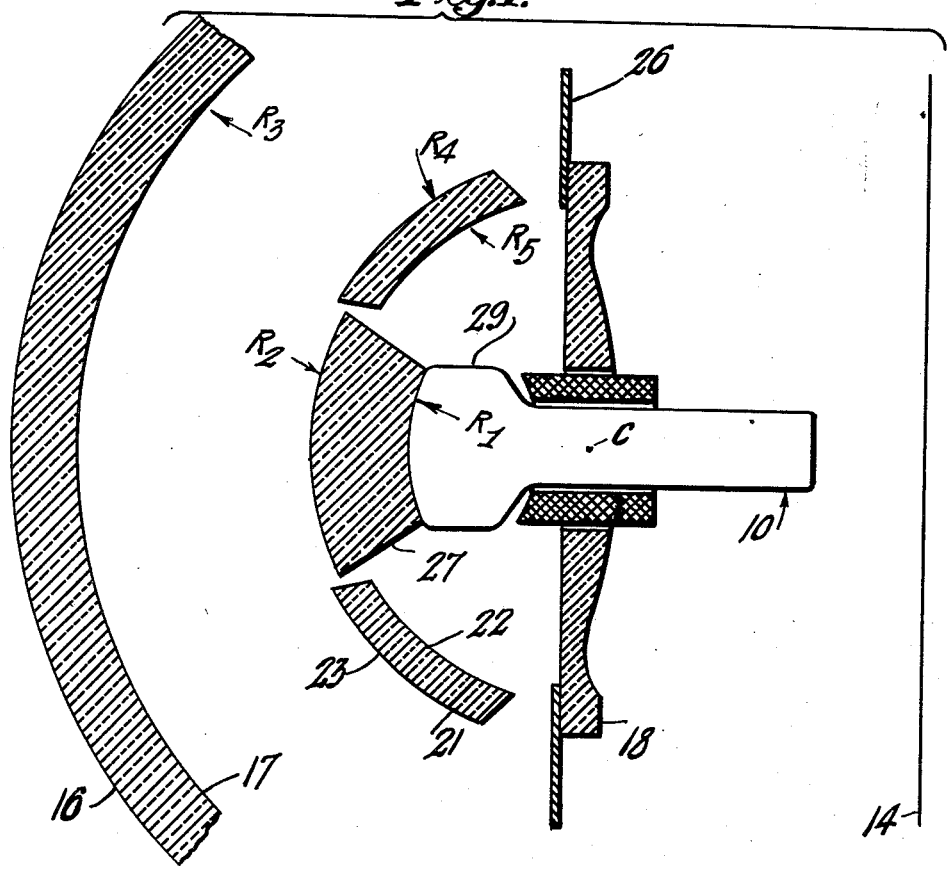
Fig. 1 is a side elevational view, partly in section, of projection apparatus embodying the invention.

In the illustrative example, it is assumed that image signals are received from a suitable radio transmitter and are then amplified and demodulated in a suitable receiver. It is also assumed that the resulting image signal is supplied through a video amplifier (not shown) to appropriately modulate the electron beam developed within a cathode ray tube 10. With the tube 10 in operation, the reproduced image appearing on the end thereof is projected upon an image viewing surface, such as that provided by a screen 14 by means of the improved optical system of the invention. The general organization of the projection system shown in the illustrative example comprises a member 16 having a spherical reflecting surface 17 and an aspheric zone plate 18 (also termed a "correcting plate" or "correcting lens"). The correcting plate is located at the center of curvature C of the spherical reflecting surface 17. An aperture or stop, such as that indicated at 26, located substantially at the center of curvature of the spherical reflecting surface 17 will, in general, improve the operation of the optical system.

A meniscus 21 has concentric spherical surfaces 22 and 23 and these surfaces are also concentric with the spherical mirror surface 17.

An antihalation lens 27 is in optical contact with the face of the tube 10. Optical details of an antihalation lens are disclosed and claimed in a copending application of the present applicant for Cathode Ray Tube Envelope, bearing Serial No. 17,967, filed March 30, 1948, now Patent No. 2,517,774, granted August 8, 1950. The following description is given for the sake of completeness of disclosure and is to be found in the application just referred to. The antihalation lens 27 is in the form of a concentric meniscus which is also concentric with the end of the tube 10. The thickness T of this lens 27 is given approximately by the relation:

$$T = \frac{N-1}{N} R_2$$

in which $R_2$ is the radius of curvature of the outer face of the lens 27. N is the index of refraction of the transparent material of the lens. The lens 27 may be in the form of a thick piece of molded transparent plastic in optical contact with the face of the tube 10. By way of example, the tube 10 or the end of the bulb 29 of the tube 10 may be of Pyrex glass. The optical member 27 may be made of methyl methacrylate in optical contact with the tube face insured by using an oil such as clear mineral oil of Canada balsam.

The focal length $f$ of the spherical mirror, meniscus and correcting lens is given by $$\frac{1}{f} = \frac{1}{f_R} + \frac{1}{f_m} - \frac{1}{f_0}$$

where $$\frac{1}{f_R} = \frac{2}{R_3}$$

is the power of the mirror, $$\frac{1}{f_m} = \frac{N_3 - 1}{N_3}\left(\frac{1}{R_5} - \frac{1}{R_4}\right)$$

is the power of the meniscus, and $$\frac{1}{f_c} = \frac{N_4 - 1}{r}$$

is the power of the central portion of the correcting lens ($r$ is the radius of curvature of the central portion of the correcting lens). $N_3$ is the index of refraction of the meniscus 21. $N_4$ is the index of refraction of the aspheric zone plate 18.

The focal length F of the complete system is $$F = \frac{f\left[1 + (N_1 - 1)\frac{R_1}{R_2}\right]}{N_1} = R_1$$

and is equal to the inner radius of curvature of the antihalation lens and thus the curvature of the focal surface (CR tube face). $N_1$ is the index of refraction of the lens 27.

If $m$ be the magnification desired with this system, then the tube is located at the distance $q_T$ from the center of curvature given as $$q_T = F\left(1 - \frac{1}{m\frac{F_2}{f}}\right)$$

and the image will be located on a flat plane at a distance of $$s = F\left[m - \frac{f}{F}\right]$$

Figure 2:
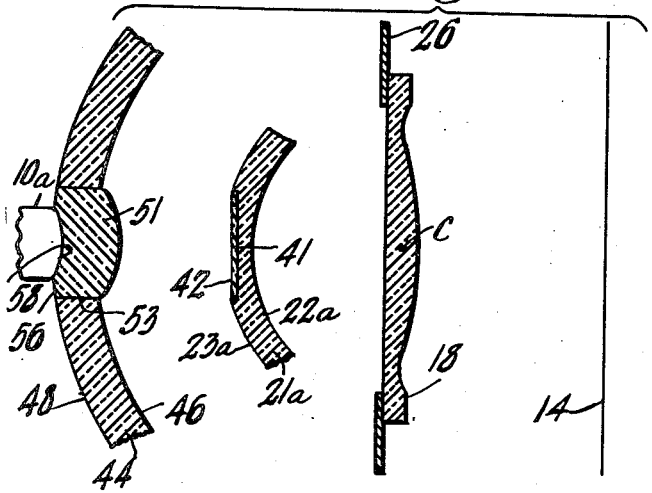
Fig. 2 is a view similar to Fig. 1 but showing projection apparatus embodying the invention in modified form.

Fig. 2 of the drawings shows an embodiment of the invention which employs a plane mirror to reverse the direction of the antihalation lens and the cathode ray tube. In Fig. 2 the meniscus 21a is substantially the same as the meniscus 21 of Fig. 1 of the drawings. This meniscus presents concentric spherical surfaces 22a and 23a. The surface 23a is flattened surrounding the axis of the system as shown by reference character 41 which is silvered or aluminized as indicated by reference character 42 to provide a plane mirror. A member 44 is provided with a spherical reflecting surface 46 which is concave toward the plane mirror surface 42. The reflecting surface may be provided in any suitable way by suitable material. The center of the mirror surface 46 is indicated at C. Preferably the surfaces 22a and 23a are concentric with the surface 46 with their centers lying at C. The convex surface 48 of the member 44 has no optical significance and, therefore, it may be of any desired or convenient configuration. An antihalation lens 51 is slidable in a bore 53 which is centered in the member 44. The back surface 56 of the member 51 is provided with a spherical depression 58 to receive the active surface of a cathode ray tube 10a. The back surface 56 surrounding the depression 58 is preferably rendered light absorbent. As pointed out previously, optical contact may be provided between the surface 58 and the tube face by using a layer of oil or Canada balsam.

The mounting of the antihalation lens 51 in the bore 53 permits the antihalation lens to be moved toward the plane mirror surface 41 to obtain optimum optical conditions. If the member 44 is made of an optically suitable material such as glass or one of the suitable plastics pointed out above then the antihalation lens 51 may be integral with the member 44.

Figure 3:
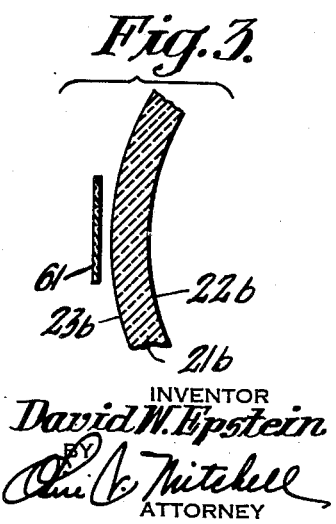
Fig. 3 shows a variation in the arrangement of Fig. 2.

Fig. 3 of the drawing illustrates a slight modification of the arrangement of Fig. 2 wherein a separate plane mirror 61 is provided which is not necessarily a part of the meniscus 21b. This meniscus 21b is the same as meniscus 21a and 21 and is provided with spherical surfaces 22b and 23b.

What is claimed is:

1. A projection system for eliminating halation and correcting error in edge resolution introduced by said halation eliminating comprising a concave spherical mirror, a correcting plate positioned to transmit light reflected from said spherical mirror, a projection tube for projecting light to said mirror, a viewing screen receiving light in the form of a readily perceptible image transmitted by said correcting plate, said tube having a transparent end, the end being optically bounded by inner and outer concentric spherical surfaces, said inner and outer spherical surfaces having radii of such relative length that the light produced upon excitation of any point on the luminescent screen is transmitted by the outer surface of the tube end without total reflection, and a meniscus positioned in the optical path between said mirror and said correcting plate said meniscus being substantially concentric with said spherical mirror.

2. A projection system comprising a concave spherical mirror, a correcting plate positioned to transmit light reflected from said spherical mirror, a projection tube for projecting light to said mirror, a viewing screen receiving light in the form of a readily perceptible image transmitted by said correcting plate, an antihalation lens for said tube optically bound by inner and outer concentric spherical surfaces, said inner and outer spherical surfaces having radii of such relative length that the light produced upon excitation of any point on the luminescent tube screen is transmitted by the outer surface of the antihalation lens without total reflection, and a meniscus positioned in the optical path between said mirror and said correcting plate said meniscus being substantially concentric with said spherical mirror, whereby to eliminate error introduced by said antihalation lens.

3. A projection system comprising a concave spherical mirror, a meniscus concentric with said concave spherical mirror positioned to transmit light received from said mirror, a correcting plate positioned to transmit light received from said spherical mirror through said meniscus, a plane mirror, a projection tube facing said plane mirror, said plane mirror being so located as to reflect light from said tube to said spherical mirror, and an antihalation lens positioned before the face of said tube in the light path from the tube to the plane mirror, whereby said meniscus corrects for error introduced into the system by said antihalation lens.

4. A projection system comprising a concave spherical mirror, a meniscus positioned to transmit light received from said mirror, a correcting plate positioned to transmit light received from said spherical mirror through said meniscus, said meniscus having means to support a plane mirror, an aperture in said spherical mirror, a projection tube facing said plane mirror through said aperture, said plane mirror being so located as to reflect light from said tube to said spherical mirror, and an antihalation lens positioned before the face of said tube in the light path from the tube to the plane mirror, means whereby said lens and said tube are movable within said aperture toward and from said plane mirror for adjustment, said meniscus being adapted to correct error in edge resolution introduced by said antihalation lens.

DAVID W. EPSTEIN.

(References on following page)

References Cited in the file of this patent

UNITED STATES PATENTS

| Number | Name | Date |
|---|---|---|
| 2,295,779 | Epstein | Sept. 15, 1942 |
| 2,298,808 | Ramberg | Oct. 13, 1942 |
| 2,346,810 | Young | Apr. 18, 1944 |
| 2,409,971 | Bennett | Oct. 22, 1946 |
| 2,458,132 | Baker | Jan. 4, 1949 |
| 2,492,461 | Bouwers | Dec. 27, 1949 |
| 2,517,774 | Epstein | Aug. 8, 1950 |
| 2,571,657 | Bennett | Oct. 16, 1951 |
| 2,585,009 | Henroteau | Feb. 12, 1952 |

FOREIGN PATENTS

| Number | Country | Date |
|---|---|---|
| 436,543 | Great Britain | Oct. 14, 1935 |
| 586,851 | Great Britain | Apr. 2, 1947 |
| 618,253 | Great Britain | Feb. 18, 1949 |

OTHER REFERENCES

Journal Scientific Instruments, vol. #22, January 1945, page 12.

Telescoptics, Scientific American, August 1939, pages 118–123.

Achievements in Optics, A. Bouwers, Elsevier Publishing Co., Inc., 1946, page 47.